United States Patent
Wang et al.

(10) Patent No.: US 8,482,186 B2
(45) Date of Patent: Jul. 9, 2013

(54) LIGHTING DEVICE

(75) Inventors: Wei-Chih Wang, Hsin-Chu (TW); Udo Custodis, Hsin-Chu (TW); Jung-Min Hwang, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 0 days.

(21) Appl. No.: 12/772,233

(22) Filed: May 3, 2010

(65) Prior Publication Data

US 2011/0266939 A1 Nov. 3, 2011

(51) Int. Cl.
*H01J 5/16* (2006.01)
*H01J 61/40* (2006.01)
*H01K 1/26* (2006.01)
*H01K 1/30* (2006.01)

(52) U.S. Cl.
USPC ........... 313/116; 313/498; 313/499; 313/512; 362/551; 362/555; 362/558

(58) Field of Classification Search
USPC ................. 313/484–487, 489, 498, 512, 467, 313/468, 499, 501–503; 257/98, 99, 100, 257/80, 79; 362/235, 227, 231, 293, 545, 362/555, 800; 345/44, 46, 80
See application file for complete search history.

(56) References Cited

U.S. PATENT DOCUMENTS

| | | | |
|---|---|---|---|
| 6,218,785 B1 | 4/2001 | Incerti | |
| 6,241,362 B1 * | 6/2001 | Morrison | 362/231 |
| 6,350,041 B1 * | 2/2002 | Tarsa et al. | 362/231 |
| 6,592,238 B2 * | 7/2003 | Cleaver et al. | 362/246 |
| 7,021,797 B2 * | 4/2006 | Miñano et al. | 362/355 |
| 7,066,637 B2 * | 6/2006 | Nozawa et al. | 362/161 |
| 7,159,994 B2 * | 1/2007 | Schnuckle et al. | 362/161 |
| 7,329,029 B2 * | 2/2008 | Chaves et al. | 362/329 |
| 7,360,935 B2 * | 4/2008 | Jensen et al. | 362/555 |
| 7,413,325 B2 * | 8/2008 | Chen | 362/249.01 |
| D589,176 S * | 3/2009 | Huang et al. | D26/4 |
| D599,491 S * | 9/2009 | Luo | D26/4 |
| 7,753,561 B2 * | 7/2010 | Chaves et al. | 362/308 |
| 2001/0033488 A1 * | 10/2001 | Chliwnyj et al. | 362/231 |
| 2002/0136027 A1 * | 9/2002 | Hansler et al. | 362/559 |

(Continued)

FOREIGN PATENT DOCUMENTS

| | | |
|---|---|---|
| DE | 8522635 | 5/1987 |
| EP | 1693615 | 8/2006 |

(Continued)

OTHER PUBLICATIONS

"Partial European Search Report of Europe Counterpart Application", issued on Aug. 3, 2011, p.1-p.6.

(Continued)

*Primary Examiner* — Nimeshkumar Patel
*Assistant Examiner* — Thomas A Hollweg
(74) *Attorney, Agent, or Firm* — Jianq Chyun IP Office (57) ABSTRACT

A lighting device includes a light guide body and at least one light-emitting unit. The light guide body has a light guide channel and a local roughened surface on the light guide channel as a scattering region. The at least one light-emitting unit is capable of emitting a light into the light guide channel, wherein at least one portion of the light is guided to the scattering region, and the scattering region scatters the light as a local light source region.

12 Claims, 6 Drawing Sheets

U.S. PATENT DOCUMENTS

| | | | |
|---|---|---|---|
| 2002/0191386 A1* | 12/2002 | Cleaver et al. | 362/31 |
| 2004/0130909 A1* | 7/2004 | Mueller et al. | 362/555 |
| 2004/0179376 A1* | 9/2004 | Chan et al. | 362/806 |
| 2004/0228131 A1* | 11/2004 | Minano et al. | 362/307 |
| 2005/0117125 A1* | 6/2005 | Minano et al. | 353/81 |
| 2005/0185398 A1* | 8/2005 | Scannell, Jr. | 362/227 |
| 2005/0225988 A1* | 10/2005 | Chaves et al. | 362/332 |
| 2006/0104068 A1* | 5/2006 | Yao et al. | 362/392 |
| 2006/0120080 A1* | 6/2006 | Sipinski et al. | 362/253 |
| 2007/0014109 A1* | 1/2007 | Pan | 362/231 |
| 2007/0091633 A1* | 4/2007 | Harrity et al. | 362/551 |
| 2007/0274087 A1* | 11/2007 | Herold | 362/516 |
| 2008/0074875 A1* | 3/2008 | Jensen et al. | 362/240 |
| 2008/0089654 A1 | 4/2008 | Lee et al. | |
| 2009/0219727 A1* | 9/2009 | Weaver | 362/373 |
| 2009/0284966 A1* | 11/2009 | Crookham et al. | 362/231 |
| 2009/0310351 A1 | 12/2009 | Lin | |
| 2010/0097821 A1* | 4/2010 | Huang et al. | 362/555 |
| 2010/0208488 A1* | 8/2010 | Luo | 362/555 |
| 2011/0057552 A1* | 3/2011 | Weaver | 313/46 |
| 2012/0026748 A1* | 2/2012 | Boonekamp et al. | 362/551 |

FOREIGN PATENT DOCUMENTS

| | | |
|---|---|---|
| GB | 2457462 | 8/2009 |
| JP | 2005-95335 | 4/2005 |
| JP | 2008-159453 | 7/2008 |
| TW | 532699 | 5/2003 |
| TW | M345924 | 12/2008 |
| TW | M371976 | 1/2010 |
| WO | 01/40702 | 6/2001 |
| WO | 2010044985 | 4/2010 |

OTHER PUBLICATIONS

"Extended European Search Report of Europe Counterpart Application", issued on Feb. 7, 2012, p.1-p.11.

"Office Action of Japan Counterpart Application", issued on Jan. 8, 2013 p.1-p.7. in which the listed reference was cited.

\* cited by examiner

LIGHTING DEVICE

BACKGROUND OF THE INVENTION

1. Field of Invention

The invention relates to a lighting device. More particularly, the invention relates to a candle-like lighting device.

2. Description of Related Art

The conventional candle lamp is designed based on tungsten filament, located at the center of a lamp cap. In this kind of candle lamp, the light source is the tungsten filament, locating within the cap. People have been familiar to the kind of lamp for a long period. However, the mechanism based on tungsten filament consumes electric power.

Figure 1:
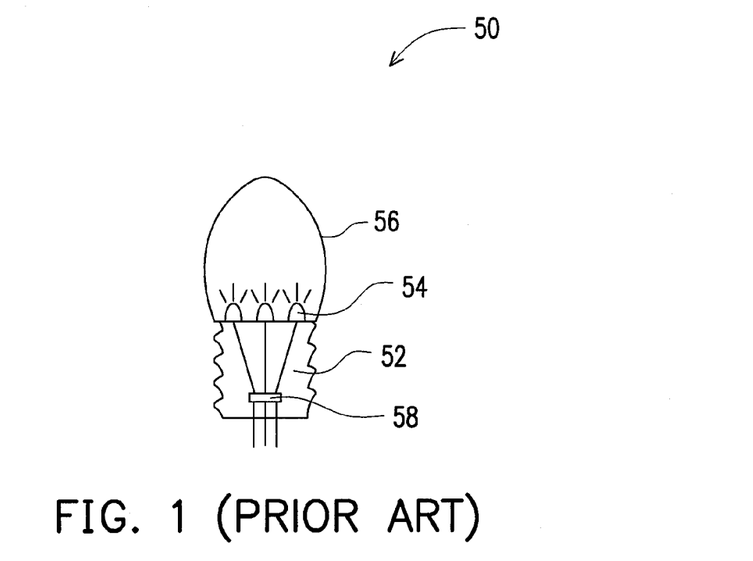
FIG. 1 is a drawing of a cross-sectional view, schematically illustrating a conventional lamp based on LEDs.

Recently, the light emitting diode (LED) light source has been well developed to provide an alternative choice for the lighting device. A disclosure of Taiwan Patent No. 532699 has disclosed a lamp based on LEDs. FIG. 1 is a drawing of a cross-sectional view, schematically illustrating a conventional lamp based on LEDs. In FIG. 1, the lamp 50 includes an electric base 52, and the LEDs 54 are disposed on the electric base 52. The power circuit 58 converts the usual power into the operation voltage for the LEDs 54 to emit light. The lamp cap 56, such as a glass cap, covers over the LEDs 54. The LED may replace the tungsten filament, resulting in saving power and other.

Noticeably, the LEDs 54 are disposed on the electric base 52 but not floating in the space. However, this design of the lamp in FIG. 1 is not in the same visual effect to the user, who has been got used to the candle lamp for long time.

Further, a disclosure of utility model patent of Taiwan Patent No. M345924 has disclosed another candle-like lamp using the LED as the light source. In addition, a cylindrical light guide body is used to guide the light to the other end. An external scattering structure is disposed on the cylindrical light guide body to scatter the light. However, the scattering structure is an external protruding part in the shape of candle flame.

Further, a disclosure of utility model patent of Taiwan Patent No. M371976 has disclosed the light guide body having an outer surface, composed of several regions with different slant angles, so as to scatter the light into a region within a larger solid angle.

Further, a disclosure of U.S. Pat. No. 6,218,785 has disclosed another lamp design also based on the LED. The cap has a chamber to receive the light from the LED. The counter surface with respect to the LED has a curving reflection surface and a central transparent region. The curving reflection surface reflects the light backward, and the central transparent region allows the light to pass and scatter to other direction.

However, more designs for the lamp based on the LED are still under developing.

SUMMARY OF THE INVENTION

The invention provides a light device using a light guide structure to guide at least one portion of the light emitted from a light-emitting unit into a local region floating over the light-emitting unit.

An embodiment of the invention provides a lighting device including a light guide body and at least one light-emitting unit. The light guide body has a light guide channel and a local roughened surface on the light guide channel as a scattering region. The at least one light-emitting unit is capable of emitting a light into the light guide channel, wherein at least one portion of the light is guided to the scattering region, and the scattering region scatters the light as a local light source region.

An embodiment of the invention provides a lighting device including a light guide body, at least one light-emitting unit, and a cap. The light guide body has an indenting part with a roughened surface thereon or a protruding part with a roughened surface thereon to serve as a scattering region. At least one light-emitting unit is capable of emitting a light into the light guide body, wherein at least one portion of the light is guided within the light guide body and reaches to the scattering region, and the scattering region scatters the light as a local light source region. The cap covers over the light guide body, wherein the local light source region is within the cap.

An embodiment of the invention provides a lighting device including a light guide body and at least one light-emitting unit. The light guide body has a concave channel and a local roughened surface on the light guide body to serve as a scattering region in connection with the concave channel. The at least one light-emitting unit is capable of emitting a light into the concave channel. The at least one portion of the light is guided within the concave channel and reaches to the scattering region, and the scattering region scatters the light as a local light source region. The light guide body with the concave channel covers over the at least one light-emitting unit.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2:
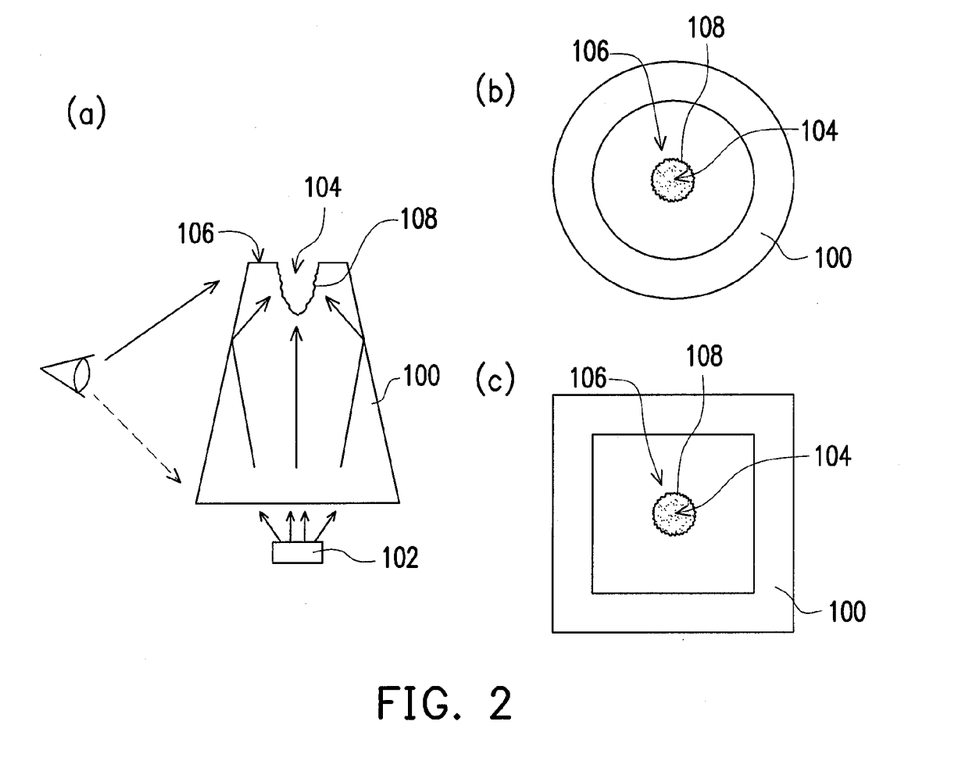
FIG. 2 is a drawing of a cross-section view and top views, schematically illustrating a mechanism of a lighting device, according to an embodiment of the invention.

FIG. 2 is a drawing of a cross-section view and top views, schematically illustrating a lighting device, according to an embodiment of the invention. In FIG. 2(a), a lighting device includes a light guide body 100 and at least one light-emitting unit 102, such as a LED. In this embodiment, the light guide body 100 forms as a light guide channel, and the light guide channel is also referred to the reference numeral 100. A local roughened surface 108 is as an indenting part 104 on the surface 106 of the light guide body 100 to serve as a scattering region. The at least one light-emitting unit 102 is capable of emitting a light into the light guide body 100 as the light guide channel. The material of the light guide body 100 may be, for example, PolyMethyl MethAcrylate (PMMA), wherein the index of refraction of PMMA is larger than one, so as to create a total internal reflection at the interfacing surface with the air. As a result, at least one portion of the light is guided to the indenting part 104 serving as the scattering region. The scattering region scatters the light to behave as a local light source region.

Here, a portion of the light may leak from the light guide body 100. However, a main portion of the light from the light-emitting unit 102 may be guided within the light guide body 100. The eye of a user may not clearly see the light-emitting unit 102. Instead, the eye may see the light at the indenting part 104.

The light guide body 100 may be cone-like structure, so as to guide the light to the indenting part 104. The indenting part 104 has the roughened surface to scatter the light into a large solid angle or even approximate to a point-like light source illuminating in full 4-pi solid angle. In other words, the indenting part 104 is the local region to emit light, like a tungsten filament. The roughened surface may be a forested-like surface. The geometric shape of the indenting part 104 is not necessarily limited to a specific one. However, the indenting shape is just one example.

In considering the geometric structure of the light guide body 100, based on the cone-like structure, the light guide body 100 may be round cone-like structure as shown in FIG. 2(b) or the polygon cone-like structure in FIG. 2(c), such as a pyramid structure. Likewise, the light guide body 100 may even be a curving surface structure or others having guiding effect to the indenting part 104. In this example, a periphery of the indenting part 104 is round. However, the periphery of the indenting part 104 may be any proper shape without limiting to round.

Figure 3:
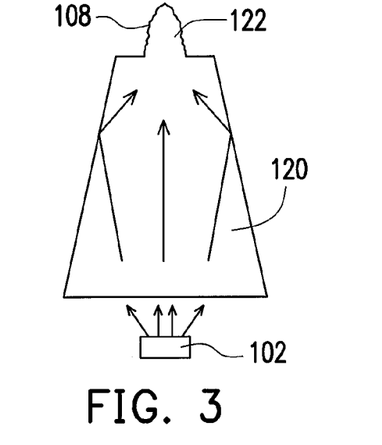
FIGS. 3-5 are cross-section views, schematically illustrating lighting devices, according to several other embodiments of the invention.

Even further, the indenting part 104 may also be modified into a protruding part, instead. FIG. 3 is a cross-section view, schematically illustrating lighting devices, according to an embodiment of the invention. In FIG. 3, the light guide body 120 is like the light guide body 100 in FIG. 2, but the indenting part 104 is modified as a protruding part 122. The protruding part 122 also has the roughened surface 108.

Figure 4:
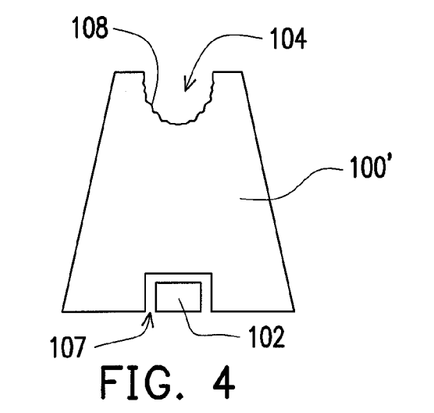

Even further, the light-emitting device 102 may be inserted in the light guide body 120. FIG. 4 is a cross-section view, schematically illustrating lighting devices, according to an embodiment of the invention. In FIG. 4, the light guide body 100' may be like the light guide body 100 in FIG. 2 with the roughened surface 108 on the indenting part 104 as an example. However, the light guide body 100' has an adapting space 107 for adapting the light-emitting device 102. As a result, the light guide body 100' and the light-emitting device 102 may sit on the same flat surface.

The light leakage at the side surface of the light guide body is a small portion and is not to be perfectively avoided in this example. In this consideration, the cone-like structure may be properly modified. However, most of the light may be still seen by the user at roughened surface 108. The guiding efficiency of the light in the light guide body 100 may be not necessarily very high. In this consideration, the cone-like structure may be uniform columnar in round area or polygon area. If the light leakage at the side is intended to be reduced, the reflection coating layer may be used. However, the visual feeling to the user may be different.

Figure 5:
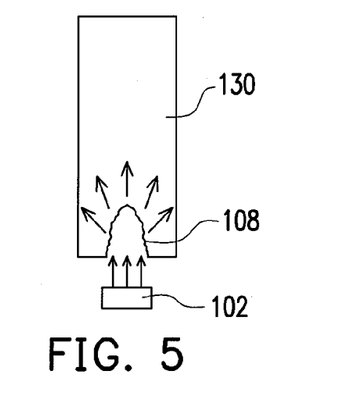

In addition, the light-emitting unit 102 may also be disposed at the same side as the roughened surface 108. FIG. 5 is a cross-section view, schematically illustrating lighting devices, according to an embodiment of the invention. In FIG. 5, the light guide body 130 is a uniform columnar structure with the indented roughened surface 108. The light-emitting unit 102 emits the light into the roughened surface 108 of the light guide body 130. The other portion of the light guide body 130 may be just a small illumination power.

Further to be noted, the scattering region with the roughened surface 108 may be at the proper location in the light guide channel The scattering region with the roughened surface 108 is not necessary to be just at the end region of the light guide channel The scattering region with the roughened surface 108 may be located at a position in the middle region not at the end region, for example.

Figure 6:
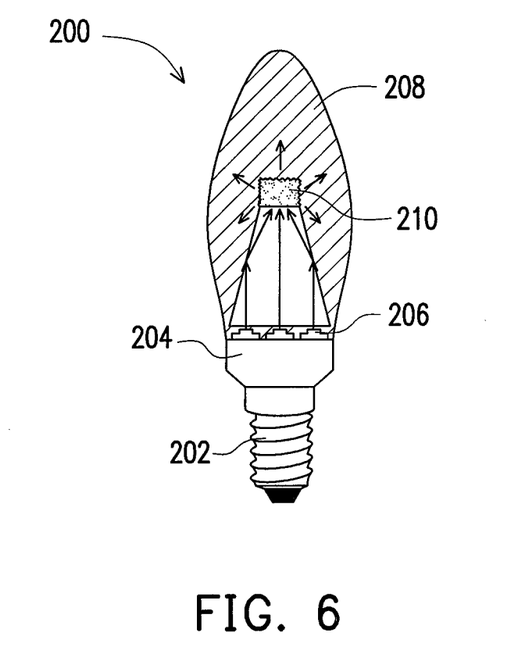
FIGS. 6-12 are cross-section views, schematically illustrating lighting devices, according to further several other embodiments of the invention.

For the lamp applications, the light guide body may be fabricated as a cap. FIG. 6 is a cross-section view, schematically illustrating a lighting device, according to a further embodiment of the invention. In FIG. 6, the lighting device 200 may include an electric base 204, and the electric base 204 has the electric power connection structure 202 for connecting to the usual power. The LED 206 is disposed on the electric base 204, and the electric base 204 is capable of providing the proper operation power to the LED 206. Then, a light guide body 208 with a concave channel in free space covers over the LED 206. The concave channel serves as the light guide channel to guide the light emitted from the LED 206 to the scattering region 210, wherein the scattering region 210 has the roughened surface, such as the forested-like surface. Noticeably, the concave channel is a free space, and the outer geometric shape of the concave channel and the scattering region 210 may be based on the mechanism of those as foregoing descriptions in FIGS. 2-5. In addition, the index of refraction of the light guide body 208 is larger than 1. In order to cause the reflection in the concave channel, the surface is accordingly adjusted, such as the adjustment of slanting angle. There is no need to restrict to a specific shape. Some light leakage from the concave channel is still allowed. Otherwise, a reflection coating layer may be formed the surface of the concave channel. As a result, the operation mechanism is the same. The light emitted from the LED 206 may be guided to the scattering region 210. The geometric shape of the outer surface of the light guide body 208 is like the candle lamp.

Figure 7:
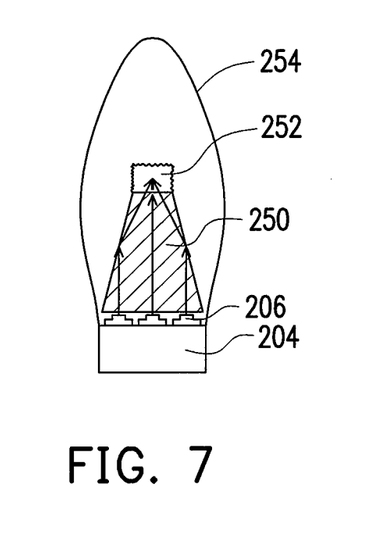

In the example of FIG. 6, the light guide body 208 is solid and made from the light guide material, such as PMMA material or even the crystal material. In this situation, the weight may be heavy. In an alternative choice, the weight may be reduced. FIG. 7 is a cross-section view, schematically illustrating a lighting device, according to a further embodiment of the invention. In FIG. 7, the lamp with the outer surface structure like the candle lamp is combined from the structures in FIGS. 2-5. In this example, the light guide body 250 itself is the light guide channel in solid structure. The light emitted from the LED 204 disposed on the electric base 204 is guide to the scattering region 252, like the mechanism as previously described. In addition, a cap 254, such as a glass cap, is covering over the light guide body 250.

Figure 8:
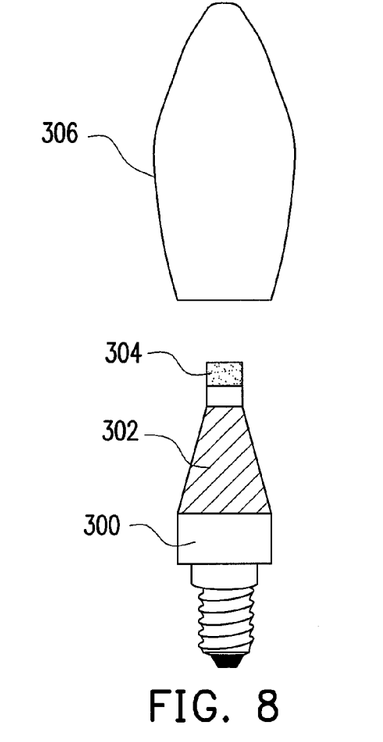

FIG. 8 is a cross-section view, schematically illustrating a lighting device, according to a further embodiment of the invention. In FIG. 8 as one example, if the structure in FIG. 4 is taken, the light guide body 302 and the LED (not shown in FIG. 8) are located at the sane surface level of the electric base 300. The scattering region 304 is disposed over the LED to emit the light. The cap 306 may be the covering over the light guide body 302.

Figure 9:
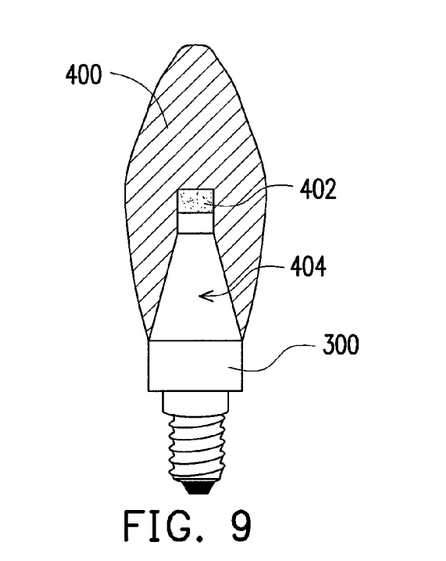

FIG. 9 is a cross-section view, schematically illustrating a lighting device, according to a further embodiment of the invention. In FIG. 9, the light guide body 400 has the concave channel 404 to serve as the light guide channel on the electric base 300. The light guide body 400 has the scattering region 402 in connection with the concave channel 404.

Figure 10:
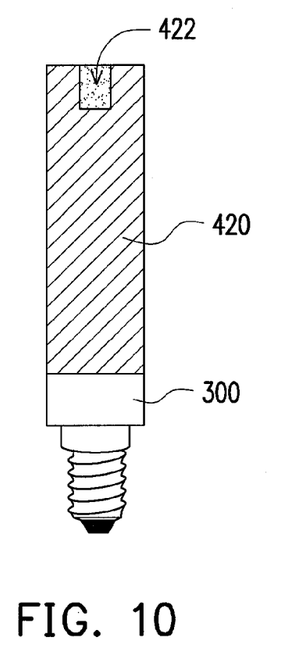

FIG. 10 is a cross-section view, schematically illustrating a lighting device, according to a further embodiment of the invention. In FIG. 10, the light guide body 420 may be a columnar structure, disposed on the electric base 300. The scattering region 422 may be the indent structure in the light guide body 420.

Figure 11:
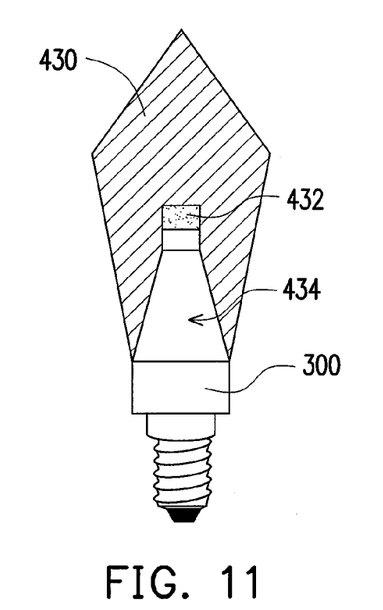

FIG. 11 is a cross-section view, schematically illustrating a lighting device, according to a further embodiment of the invention. In FIG. 11, in further design to increase the decoration effect, like a crystal lamp, the light guide body 430 may have the cutting surfaces to produce sparkling effect. In this design, the scattering region 432 is connected with the light guide channel 434.

Figure 12:
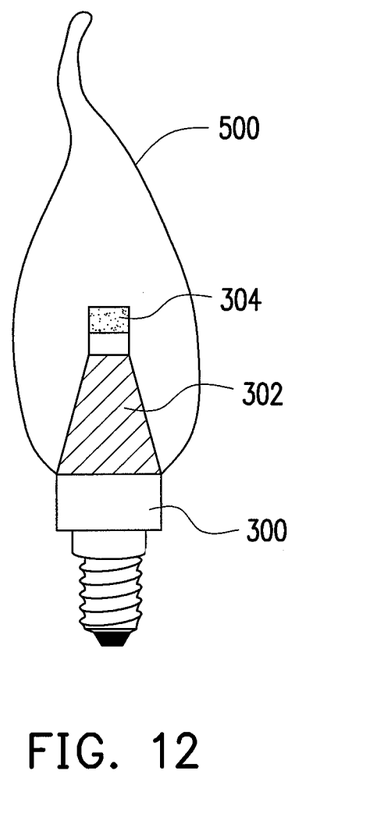

FIG. 12 is a cross-section view, schematically illustrating a lighting device, according to a further embodiment of the invention. In FIG. 12 for another application, the light guide body 302 with the scattering region 304 is taken. However, the cap 500 may have the decoration shape, like the candle flame.

In summary, the embodiment or embodiments of the invention may have at least one of the following advantages:

The embodiment of the invention uses the light guide body with the scattering structure directly formed on the light guide body. The light of the LED may be guided to the scattering structure. The light guide body itself may have the geometric shape to improve the decoration effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims

What is claimed is:

1. A lighting device, comprising:
a light guide body, having a first end, a second end opposite to the first end, and a side surface to join the first end and the second end, wherein the first end is larger than the second end, and a local scattering region by a roughen surface is disposed on and protrudes outside the second end, and wherein the local scattering region in all of its transverse cross sections is smaller or equal to the second end, wherein the light guide body has cutting surfaces at a region other than the local scattering region to produce sparkling effect; and
at least one light-emitting unit, capable of emitting a light into the light guide body, disposed adjacent to the first end, wherein at least one portion of the light is guided within the light guide body to reach the local scattering region, and the local scattering region with an effect to destroy total internal reflection scatters and refracts the light through the local scattering region to a space external to the light guide body as a local light source region.

2. The lighting device of claim 1, wherein the at least one light-emitting unit comprises a light emitting diode.

3. The lighting device of claim 1, wherein the roughened surface is a frosted-like surface.

4. The lighting device of claim 1, wherein the side surface of the light guide body is cone-like surface.

5. A lighting device, comprising:
a solid light guide block, having an outer surface and a concave channel portion along a center line from one end surface of the solid light guide block, wherein the outer surface is not conformal to a contour of the concave channel portion and a local roughened surface on the solid light guide block is at a concave end surface of the concave channel portion to serve as a scattering region, wherein the solid light guide block has cutting surfaces at a region other than the scattering region to produce sparkling effect;

at least one light-emitting unit capable of emitting a light into the concave channel portion, wherein at least one portion of the light is guided within the concave channel portion and reaches to the scattering region, and the scattering region scatters and refracts the light through the scattering region to outside the concave channel portion as a local light source region, wherein the solid light guide block with the concave channel portion covers over the at least one light-emitting unit.

6. The lighting device of claim 5, wherein the concave channel portion is a uniform columnar space, a round cone-like space, a polygon cone-like space, or a curving surface space.

7. The lighting device of claim 5, wherein the concave channel portion has a first end region and a second end region, the scattering region is at the first end region, and the at least one light-emitting unit is at the second end region.

8. The lighting device of claim 7, wherein a transverse cross-sectional area of the first end region is smaller than a transverse cross-sectional area of the second end region.

9. The lighting device of claim 5, wherein the at least one light-emitting unit comprises a light emitting diode.

10. The lighting device of claim 5, wherein the local roughened surface of the scattering region is a frosted-like surface.

11. The lighting device of claim 5, wherein an opening end of the concave channel portion is wider than the concave end surface.

12. The lighting device of claim 5, wherein the concave channel is a round cone-like space, a polygon cone-like space, or a curving surface space.

* * * * *